(12) United States Patent
Trevino et al.

(10) Patent No.: US 8,260,896 B2
(45) Date of Patent: Sep. 4, 2012

(54) MONITORING BUSINESS MACHINES USING A MESH NETWORK ON FIELD NODES

(75) Inventors: Ramiro Trevino, Mesa, AZ (US); Lester Anderson, Verona, NJ (US)

(73) Assignee: MWA Intelligence, Inc., Scottsdale, AZ (US)

( * ) Notice: Subject to any disclaimer, the term of this patent is extended or adjusted under 35 U.S.C. 154(b) by 1143 days.

(21) Appl. No.: 12/022,253

(22) Filed: Jan. 30, 2008

(65) Prior Publication Data

US 2008/0186871 A1 Aug. 7, 2008

Related U.S. Application Data

(60) Provisional application No. 60/887,935, filed on Feb. 2, 2007.

(51) Int. Cl.
*G06F 15/173* (2006.01)
*G08B 13/14* (2006.01)
(52) U.S. Cl. .................................... 709/223; 340/572.1
(58) Field of Classification Search .......... 709/223–224; 340/572.1
See application file for complete search history.

(56) References Cited

U.S. PATENT DOCUMENTS

| | | | |
|---|---|---|---|
| 5,077,582 A | 12/1991 | Kravette et al. |
| 5,184,179 A | 2/1993 | Tarr et al. |
| 5,333,286 A | 7/1994 | Weinberger et al. |
| 5,361,265 A | 11/1994 | Weinberger et al. |
| 5,602,838 A | 2/1997 | Kartalopoulos |
| 5,603,060 A | 2/1997 | Weinberger et al. |
| 5,606,551 A | 2/1997 | Kartalopoulos |
| 6,009,284 A | 12/1999 | Weinberger et al. |
| 6,282,383 B1 | 8/2001 | Weinberger et al. |
| 6,581,092 B1 | 6/2003 | Motoyama et al. |
| 6,631,247 B1 | 10/2003 | Motoyama et al. |
| 6,714,971 B2 | 3/2004 | Motoyama et al. |
| 6,725,401 B1 | 4/2004 | Lindhorst-Ko |
| 6,826,267 B2 | 11/2004 | Daum et al. |
| 6,839,717 B1 | 1/2005 | Motoyama et al. |
| 6,915,337 B1 | 7/2005 | Motoyama et al. |
| 6,915,342 B1 | 7/2005 | Motoyama |
| 6,925,571 B1 | 8/2005 | Motoyama et al. |
| 7,024,473 B2 | 4/2006 | Parent |

(Continued)

FOREIGN PATENT DOCUMENTS

DE 10033316 A1 1/2002

(Continued)

OTHER PUBLICATIONS

International Application No. PCT/US2008/052658, Communication Relating to the Results of the Partial International Search, dated Jan. 15, 2009, 2 pages.

*Primary Examiner* — Shirley Zhang
(74) *Attorney, Agent, or Firm* — Holland & Hart LLP

(57) ABSTRACT

Methods, systems, devices, and software are described for data transmission to and from a monitored device via a mesh network. Monitoring devices report usage, status, location, and other pertinent data via a mesh network, and perhaps other networks as well. Novel data collection, transmission, and aggregation techniques are described. Data transfer may be bi-directional in order to manage and update device status and operation. The monitored device location may be tracked with the reported information.

21 Claims, 11 Drawing Sheets

U.S. PATENT DOCUMENTS

| | | |
|---|---|---|
| 7,043,551 B2 | 5/2006 | Motoyama et al. |
| 7,047,293 B2 | 5/2006 | Motoyama et al. |
| 7,050,806 B2 | 5/2006 | Garces et al. |
| 7,057,555 B2 | 6/2006 | Lewis |
| 7,069,483 B2 | 6/2006 | Gillies et al. |
| 7,084,756 B2 | 8/2006 | Stilp |
| 7,131,070 B1 | 10/2006 | Motoyama et al. |
| 7,139,820 B1 | 11/2006 | O'Toole, Jr. et al. |
| 7,149,499 B1 | 12/2006 | Oran et al. |
| 7,171,670 B2 | 1/2007 | Motoyama et al. |
| 7,180,852 B1 | 2/2007 | Doverspike et al. |
| 7,181,619 B2 | 2/2007 | Motoyama et al. |
| 7,215,658 B2 | 5/2007 | Alastalo |
| 2003/0030842 A1 * | 2/2003 | Suyehira ............... 358/1.15 |
| 2003/0086368 A1 | 5/2003 | Limaye et al. |
| 2004/0259555 A1 | 12/2004 | Rappaport et al. |
| 2005/0253718 A1 | 11/2005 | Droms et al. |
| 2005/0253722 A1 | 11/2005 | Droms et al. |
| 2006/0019679 A1 | 1/2006 | Rappaport et al. |
| 2006/0111796 A1 | 5/2006 | Van Heteren |
| 2006/0120370 A1 | 6/2006 | Ginchereau et al. |
| 2006/0122481 A1 | 6/2006 | Sievenpiper et al. |
| 2006/0146717 A1 | 7/2006 | Conner et al. |
| 2006/0154642 A1 | 7/2006 | Scannell |
| 2006/0158329 A1 | 7/2006 | Burkley et al. |
| 2006/0240848 A1 | 10/2006 | McMahan et al. |
| 2006/0250980 A1 | 11/2006 | Pereira et al. |
| 2006/0258375 A1 | 11/2006 | Wilbrink et al. |
| 2006/0270349 A1 | 11/2006 | Overy et al. |
| 2007/0001868 A1 | 1/2007 | Boaz |
| 2007/0099634 A1 | 5/2007 | Chari et al. |
| 2007/0103303 A1 * | 5/2007 | Shoarinejad ............... 340/572.1 |
| 2007/0104123 A1 | 5/2007 | Tomici et al. |
| 2007/0115951 A1 | 5/2007 | Karaoguz et al. |
| 2007/0165787 A1 | 7/2007 | Kim et al. |

FOREIGN PATENT DOCUMENTS

| | | |
|---|---|---|
| JP | 2003102052 | 4/2003 |
| JP | 2006195811 | 7/2007 |
| WO | WO 92/03789 A1 | 3/1992 |
| WO | WO 2005/057834 A2 | 6/2005 |

* cited by examiner

MONITORING BUSINESS MACHINES USING A MESH NETWORK ON FIELD NODES

CROSS REFERENCES

This application claims priority from U.S. Provisional Patent Application No. 60/887,935, filed Feb. 2, 2007, entitled "METERING DEVICE MESH NETWORK SYSTEMS AND METHODS", which is hereby incorporated by reference, as if set forth in full in this document, for all purposes. This application is also related to U.S. patent application Ser. No. 09/929,398, filed Aug. 14, 2001, and entitled "AUTOMATED BUSINESS MACHINE MANAGEMENT", which is also hereby incorporated by reference, as if set forth in full in this document, for all purposes.

BACKGROUND

The present invention relates to remote monitoring of a device in general and, in particular to remote monitoring of a device via a mesh network.

Advances in communication networks and electronics, and decreases in the cost of the components therein, have made the remote monitoring of devices become increasingly widespread. Often, devices may be connected to a local area network, and equipped with sensors or other readers which monitor and report status and usage over the local area network. However, this can be limiting because the monitored device may be a mobile device or may be remote from a network connection. Many such monitoring techniques may also be susceptible to a single point of failure. Also, many networks have security features or limited operation hours that may prevent monitoring at certain times.

Although wireless solutions may provide an alternative, they typically require that the communications be transmitted through a service provider (e.g., via pager, cellular, etc.). However, service provider charges may increase the costs in such implementations. In light of the foregoing, it may be desirable to have flexible remote monitoring systems and methods that leverage diverse monitoring networks and are less susceptible to failure.

SUMMARY

Methods, systems, devices, and software are described for multipath data transmission to and from a monitored device via a mesh network. In one embodiment, data collection, transmission, and aggregation are described from one or more devices reporting usage, status, location, and other pertinent data. Data transfer may be bi-directional in order to manage and update device status and operation. The monitored device location may be tracked with the reported information.

In a first set of embodiments, a system for monitoring business machines using a mesh network is described. Field nodes of a mesh network are configured to monitor usage of selected business machines to generate a first set of monitoring data for transmission through the mesh network. A base station node is configured to receive and aggregate monitoring data. A consolidating server is configured to receive an aggregated set of monitoring data, and collect a second set of monitoring data from business machines via a second network distinct from the mesh network. The consolidating server may transmit the first and second sets of monitoring data via a third network to a central server computer system for further processing.

A field node may be integrated into or removably attached to a business machine. A single business machine may be configured to transmit data via both the mesh network and the second network, perhaps allowing the mesh network to be used if the second network becomes unavailable. The consolidating server or base station node may transmit a disable or shut off command to the field node to control operation of the monitored business machine. Business machines may include a copier, fax, printer, and/or or scanner, and the monitoring data may be usage data, status data, or location data. The base station node or consolidating server may identify a change in location (or, more specifically, the new location) of a field node based on a change in a routing table entry associated with the mesh network.

In another set of embodiments, a method of collecting business machine monitoring data is described. A first set of business machine monitoring data collected from field nodes of a mesh network is received via the mesh network, and this data may be aggregated before it is received. A second set of business machine monitoring data is also received, the data collected from a second set of connected business machines on a second network distinct from the mesh network. The first set and the second set of business machine monitoring data are transmitted to a central server computer system via a third network distinct from the mesh network and second network.

In another set of embodiments, a routing table for one or more field nodes in a mesh network is monitored. The routing table may be associated with a single field node, or may be a routing table for a group of field nodes. Location identification information for one or more of the field nodes is established. Thus, certain field nodes may be associated with certain areas (e.g., rooms, floors, or buildings). The location of such field nodes may be known or estimated, and the field nodes may be mobile or affixed.

A change in the monitored routing table is identified for one or more of the field nodes. The change in location for a field node is recognized based on the identified change in the monitored routing table and the location identification information. The change in location may be the identification of a new location or area (e.g., based on an association in a routing table between a field node and a known location), or may simply be an identification of the change. The identified change may result in a re-authentication requirement, additional security commands, or a disable command.

In still another embodiment, an example configuration of a field node in a mesh network for monitoring a business machine is described. The field node includes a first monitoring unit configured to monitor a business machine to generate a set of monitoring data. The field node also includes a routing unit configured to maintain a routing table and use the routing table to identify a destination field node within the mesh network. A first transmitting unit is configured to transmit the set of monitoring data to the destination field node.

The field node may also include a receiving unit to receive other monitoring data from other field nodes of the mesh network, and pass the received monitoring data to the transmitting unit for forwarding. The receiving unit may be configured to receive and execute a disable command initiated by a consolidating server, the disable command generated because of an identified changed location for the field node.

The field node may be attached to or integrated with the monitored business machine. The monitored business machine may include a second monitoring unit, distinct from the first monitoring unit, and configured to monitor the business machine to generate and additional set of monitoring data. The monitored business machine may include a second transmitting unit, distinct from the first transmitting unit, and configured to transmit the generated second set of monitoring data over a second network.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Systems, devices, methods, and software are described for multipath data transmission to and from a monitored device via a mesh network. In one embodiment, data collection, transmission, and aggregation are described from one or more monitored devices through a mesh network reporting usage, status, location, and other pertinent data. Data transfer may be bi-directional in order to manage and update device status and operation. The system may be configured to collect information from both connected devices and from devices via the mesh network. The location of a device may be monitored for changes in using routing tables for the mesh network.

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Figure 1:
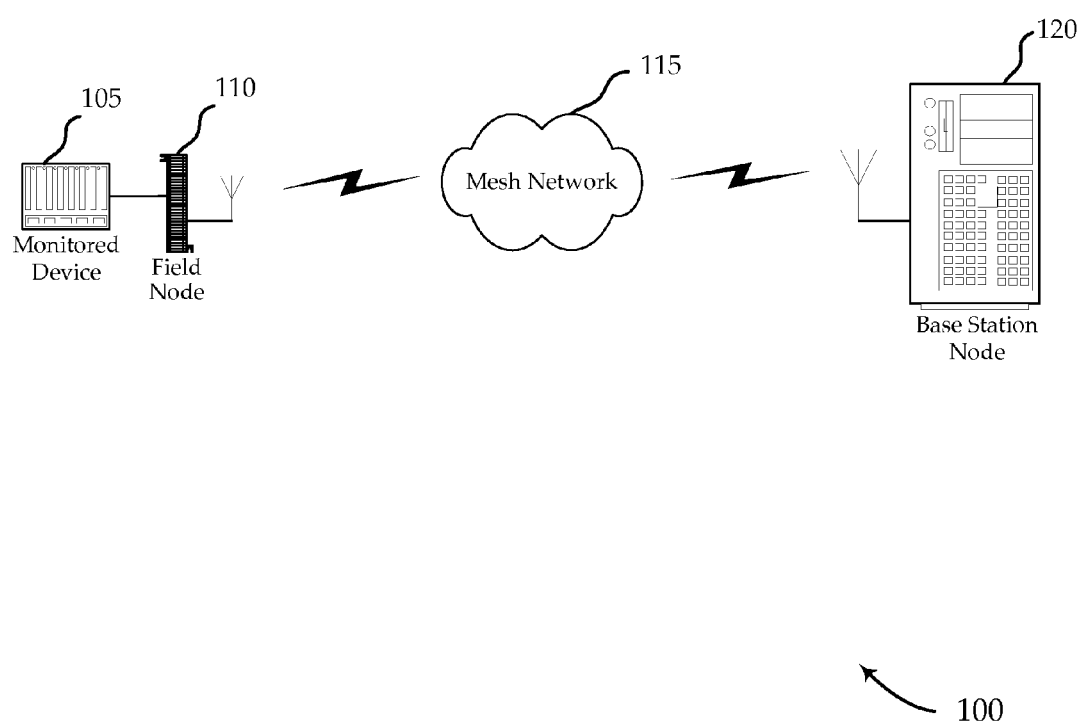
FIG. 1 is a block diagram illustrating a system for monitoring a device using a mesh network configured according to various embodiments of the invention.

Referring first to FIG. 1, an example of a system 100 configured according to various embodiments is illustrated that includes a monitored device 105, a field node 110 attached or integrated into the monitored device 105, a mesh network 115, and a base station node 120. The monitored device 105 may be a copier, fax, scanner, computer, or other business machine. Moreover, the monitored device 105 may be any piece of equipment, vehicle, or data interaction unit which generates or communicates information that is used for usage measurement, status, or location reporting (e.g., a movable asset which may be location tracked). The device 105 may, for example, be a gas, electric, or other utility meter, or may be a medical device. It may, for example, be any device which outputs usage and/or peak usage information.

A field node 110 is connected with, integrated into, or otherwise in communication with the monitored device 105. The field node 110 reads, monitors, checks, or otherwise receives status or usage information from the monitored device 105. The field node 110 may, for example, acquire data from any data port, sensor or signaling mode of a device 105, and may be internal or external to the monitored device 105. The field node 110 wirelessly transmits monitoring data (e.g., status, usage, or location information) to or through the mesh network 115.

A mesh network 115 is a wireless network in which devices are connected with redundant paths (e.g., more than a single point of failure) between routing nodes of the network. In a mesh network, connection and data paths may be established and updated to allow communications with two or more paths between the field node 110 and the base station node 120.

A mesh network 115 may be configured automatically, and updated at certain intervals in an ongoing learning mode. The mesh network 115, therefore, may be configured to determine, establish, and record a most efficient data path for the system transfer of data from the field node 110 to the base station node 120 through the mesh network 115. Path determination may occur at each monitored device 105, or the path determination process may be centralized (e.g., made at the base station node 120 or another central server computer, and distributed through the system), Also, alternate paths may be identified for more timely and accurate transmission of the data if one or several of the router nodes becomes inoperative, usage saturated, or otherwise unavailable. Communication may, therefore, be through a prescribed or derived path, and unique identifiers may be collected to identify the path, and passed along from intermediate router nodes to a base station node 120.

As noted, the system also includes a base station node 120, in wireless communication with one or more routing nodes of the mesh network 115. The base station node 120 receives the usage, status, or location information transmitted by the field node 110 through the mesh network 115. The base station node 120 may accept, acknowledge reception, and document the reception path of the data. The base station node 120 may aggregate the data. The base station node 120 may pass along all or part of the accumulated and/or aggregated data from the devices to a central computer system, another network or a computer database. Thus, the base station node 120 may aggregate and process the received information, or may simply forward the information (perhaps through the Internet, for example). A reverse path data stream through the mesh network 115 to update a device based on its condition with more current data (e.g., firmware or device operational authority or device identification) may be initiated or passed through the base station node 120. The reverse path data stream may control certain operations of the device (e.g., shutting down the device based on a change in a routing table entry).

In one embodiment, the system 100 collects status, consumable replenishment, usage (e.g., meter data), office area physical location, and unique node identifier information from a monitored device 105 such as a copier, printer, or other business machine in an office environment. In another embodiment, the system 100 may collect usage data and connection status of a monitored device 105 for an electrical, or heating/cooking gas, or potable water distribution system, where a field node 110 may provide usage metering, peak usage metering and connection (electrical or pressure) status.

In yet another embodiment, the system 100 collects data on a medical device 105, including the operational status, consumables level and replenishment needs. A field node 110 may report an operational alerting status of health care delivery related devices in a hospital, clinic, doctor's office, or other health care delivery locations. In one embodiment, the system 100 collects location information and usage (mileage) from off-road vehicles, such as farm equipment, or on-road vehicles, such as trucks, buses, or rent-a-cars, where the location information component of that instantaneous usage (mileage) may be used in order to establish a more accurate usage metric. Another embodiment of the system 100 may collect determination of firmware updates of a device 105, and where needed, transfer data to the devices from the central data repository with appropriate data, commands and authorizations to update the firmware in said device.

Figure 2:
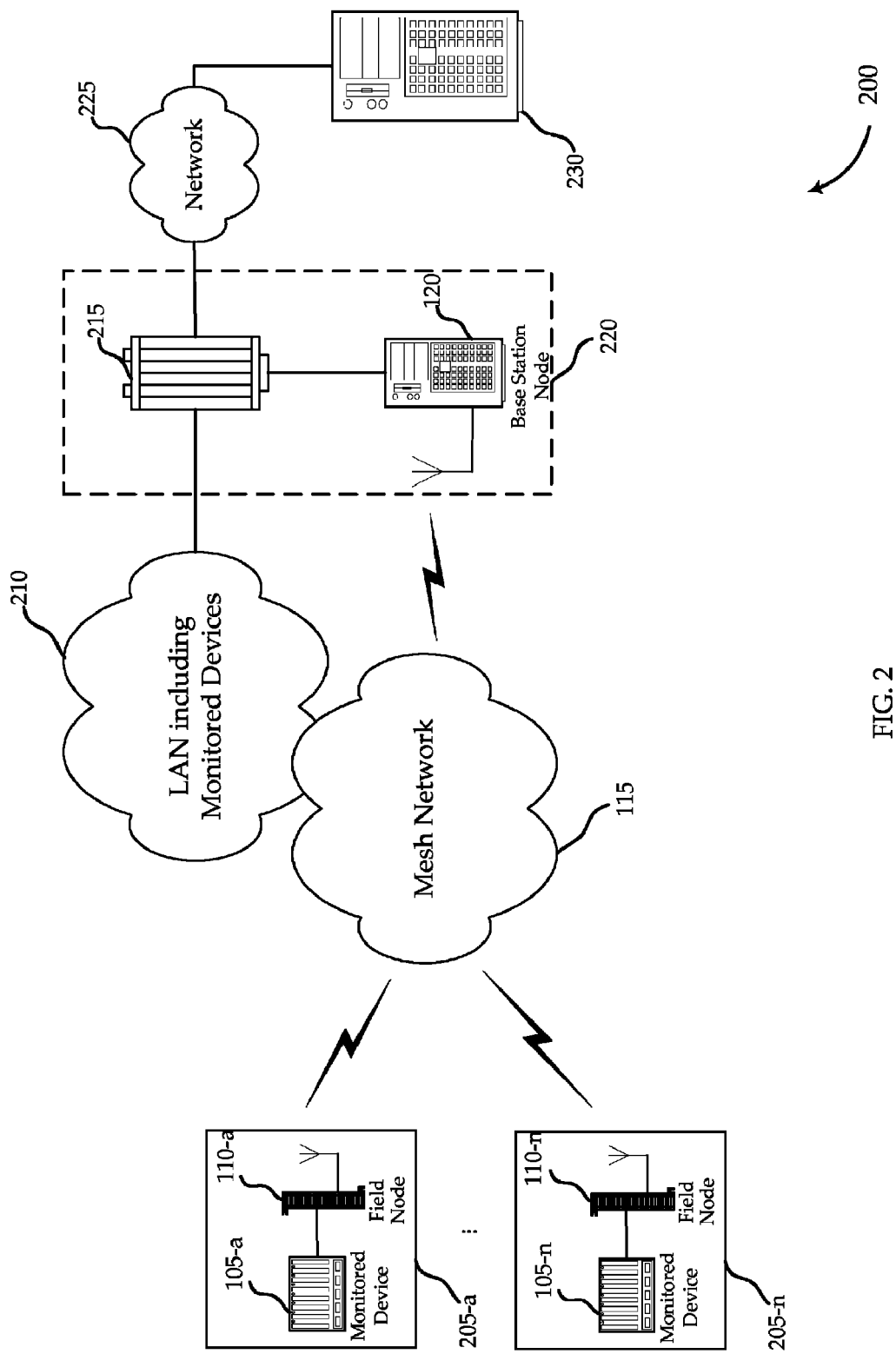
FIG. 2 is a block diagram illustrating a system for monitoring devices using a mesh network and a second network configured according to various embodiments of the invention.

Referring next to FIG. 2, an example of a system 200 is illustrated which includes n monitored devices 105, which are in communication with a mesh network 115 via field nodes 110. The system 200 of FIG. 2 illustrates an example embodiment of the system 100 described with reference to FIG. 1. The field nodes 110 may be attached to, or integrated into, the monitored device 105. In one embodiment, any subset of the n monitored devices 105 in communication with a mesh network 115 also function as routing nodes 205 of the mesh network 115. Thus, any subset of the field nodes 110 may also be part of the mesh network 115. The mesh network 115 provides a communication path for the devices 105 to communicate with the base station node 120. The system 200 of FIG. 2 also has a local area network 210 that includes other monitored devices. The local area network 210 may be a wired network distinct from the mesh network 115, but may also have wireless components. A monitored device 105 may be connected with both the local area network 210 and mesh network 115.

The system 200 of FIG. 2 includes a consolidating server 215, which is in communication with the base station node 220 and the local area network 210. The consolidating server 215 may receive and process the usage, status, and location data received for monitored devices 105 via the mesh network 115. The consolidating server 215 may also collect the usage, status, and location data received for monitored devices from the local area network 210. Alternatively, the consolidating server 215 may perform relatively little processing, and instead forward essentially raw data through another network 225 (e.g., the Internet, or another network distinct from the mesh network 115 and local area network 210) to a central server computer system 230 for additional processing.

Although the consolidating server 215 and base station node 120 may be separate devices, they may also be integrated into a single device or set of devices 220. The consolidating server 215 (or integrated device 220) may receive and acknowledge data from the mesh network 115 and other types of networks, as well (e.g., in addition to or in lieu of the local area network 210, data may be received from a cell phone, pager, wi-fi network, or use of one of several protocols including GSM, CDMA, SMS, or GPRS). The consolidating server 215 (or integrated device 220) may consolidate or separate data received from the various sources into several distribution targets (e.g., different addresses in the network 225 or central server computer system 230) based on rules of type and content of data elements. As noted, a monitored device 105 may be connected to both the mesh network 115 and the local area network 210 or other network (e.g., for purposes of additional redundancy). Thus, a field node 110 may be configured to transmit monitoring data when the local area network 210 is not operational (e.g., when it not able to transmit monitoring data due to network failure, security limitations, government regulation, or other factors)

In one embodiment, a consolidating server 215 receives monitoring data (e.g., usage, status, or location information from the LAN 210 and/or the mesh network 115) and transfers that data to an external database (e.g., central server computer system 230). The central server computer system 230 determines the need for service or a device upgrade. The central computer system 230 may transmit return path data to a monitored device 105 with the information to update the firmware, status, or operational condition of the device 105. Where physical interaction is needed (e.g., for repair or consumables replenishment), the central computer system 230 may provide location mapping of the monitored devices 105 (integrated across networks) in order to allow a dispatch system to most effectively and efficiently route the sequential visitation of the devices 105. The consolidating server 215 may also perform any part of upgrade or service determination, mapping, and/or dispatch.

Figure 3:
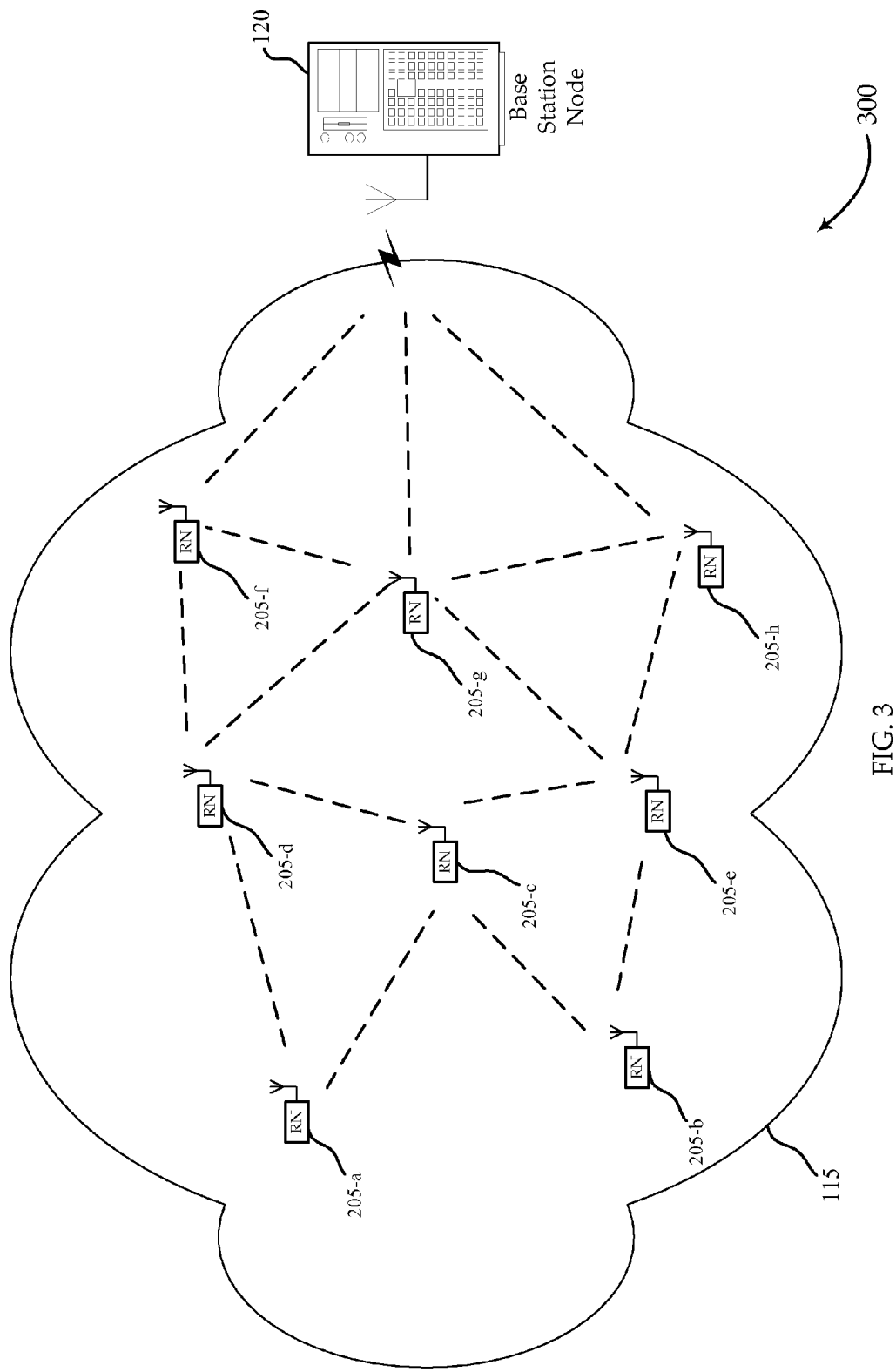
FIG. 3 is a block diagram illustrating a mesh network monitoring system configured according to various embodiments of the invention.

Referring next to FIG. 3, an example of a system 300 is illustrated which includes a mesh network 115 in communication with a base station node 120. The system 300 of FIG. 3 illustrates various embodiments of the system 100 described with reference to FIG. 1. The mesh network 115 of the system 300 of FIG. 3 includes a number of routing nodes 205. These routing nodes 205 may be the routing node described with reference to FIG. 2. The routing nodes 205 of FIG. 3 may each be in communication with a subset (or all) of the other routing nodes 205 of the mesh network 115. Each routing node 205 may also be a field node 110 attached to or integrated into a device 105. Thus, a field node 110 may have the capability to act in a dual mode, for other devices acting as a routing node 205 to pass along information from other devices to or through the mesh network 115.

For example, assume that routing node 205-a is also a field node 110 transmitting status, usage, or location data through the mesh network 115 to the base station node 120. The redundant paths through the mesh network 115 could be a first path through 205-d and 205-f to the base station node 120, and a second path through 205-c, 205-e, and 205-h to the base station node 120. The mesh network 115 may also be configured to identify a best and/or most direct path to a base station, based on predetermined rules (e.g., standard rules or specific rules based on the device 105 or type of information, such as status, usage, or location).

The routing nodes 205 of the mesh network 115 may also transmit location information allowing, for example, the base station node 120, consolidating server 215, or other computing device to determine the location of a device 105, or simply that a device location has changed. The location information may be based on changes in routing table information. For example, when a routing table for a routing node 205 changes, a new routing table entry may indicate proximity to known locations (e.g., new rooms, floors, or buildings) of other routing nodes 205. As used herein, a "routing table" may include any table or other data structure indicating a path or paths through routing nodes 205 of a mesh network 115. Various actions may be directed based on changed locations, as access to a monitored device 105 may be shut down or limited, re-authentication may be required, and so on.

By way of example, the time difference of arrival, angle of arrival, and location pattern matching methods may also be used for the mesh network 115 to obtain location information. Location information may be based on triangulation or by special antenna design using routing nodes 205, or other access points or cellular towers. The location information may, alternatively, be in the form of satellite location information (e.g., GPS), cellular location information, network analysis of location information, location information specific to a building, or other means for location determination. The location information may be GPS coordinates or any other GPS related location information. Additionally, any combination of the above may be used as well, and it is anticipated that location technologies will evolve and the term location information is to be interpreted to include the reception of new forms of location based data.

The location information may be used by a base station node 120 or other computing device, in conjunction with other status or usage information, to identify a sequential service progression through devices 105 requiring service. Thus, the base station node 120 or other computing devices may use the location information, along with other priority information (e.g., service to a medical device at a hospital may be deemed more important than refilling an ink cartridge), to determine service order and priority. The sequential order of service may be determined automatically, or may be provided to a dispatcher. The location information may be utilized to create image data illustrating a map of service stops, and the map may be transmitted to the service technician.

The router nodes 205 (either single purpose router nodes 205 or field nodes 110 serving as a router nodes 205) may, therefore, pass along status, usage, and location information to a base station node 120. In that process, the router nodes 205 may add a router node identification code, in order to assist the determination of the physical location of the nodes 205, both to optimize routing in the mesh network 115 and to identify the location of a device in need of service.

Figure 4A:
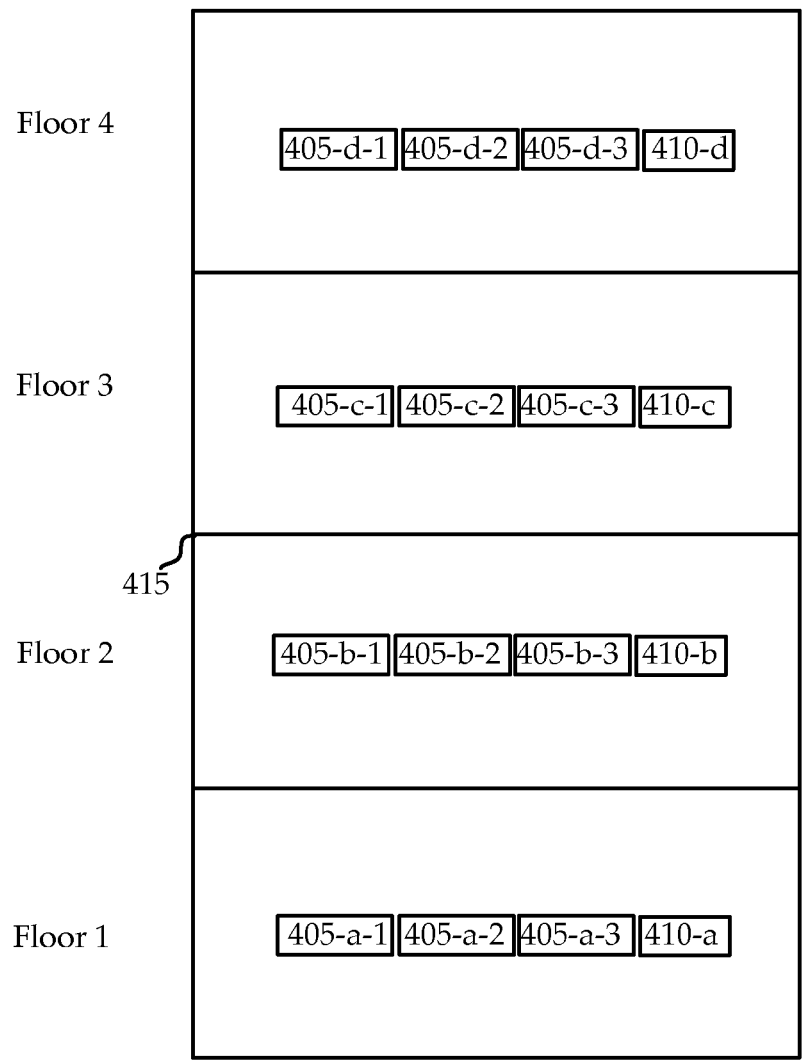
FIGS. 4A and 4B are block diagrams illustrating field nodes communicating via a mesh network in a building according to various embodiments of the invention.
Figure 4B:
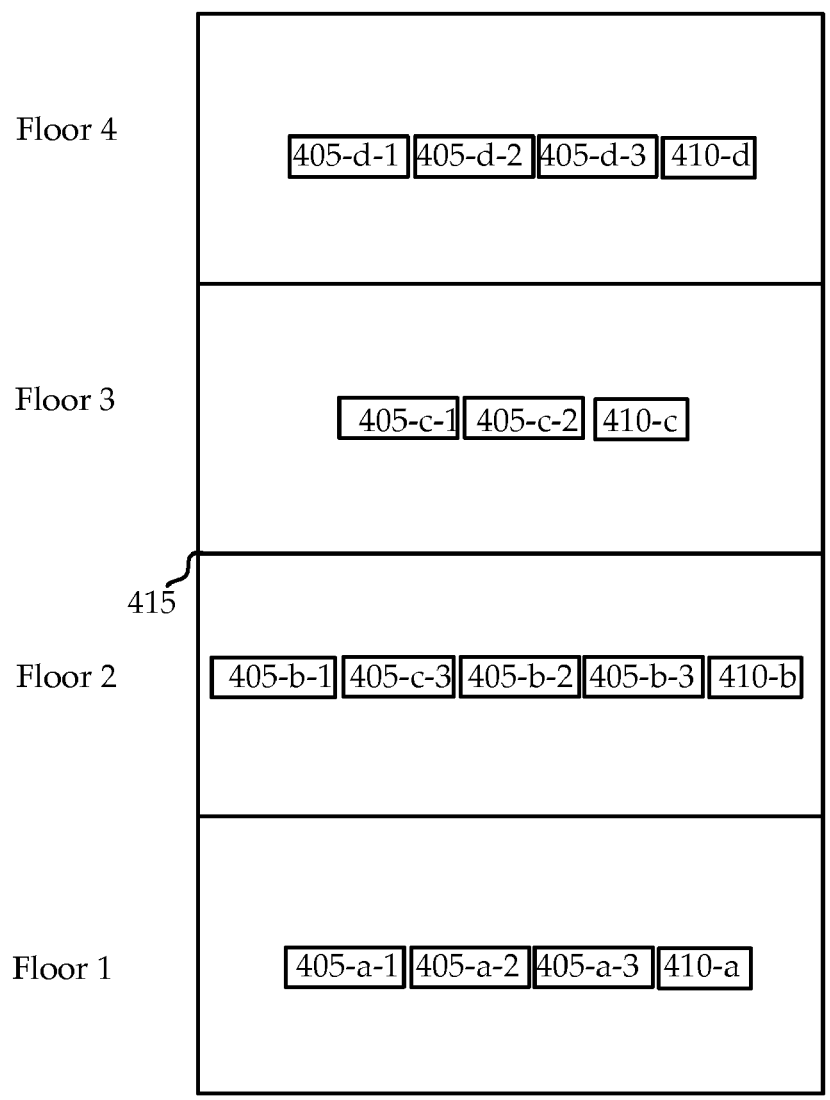

Referring next to FIG. 4A and FIG. 4B, block diagrams 400, 450 are shown illustrating an example of field nodes 405, 410 communicating via a mesh network in a building according to various embodiments of the invention. These field nodes 405, 410 may be a field node 110 of FIG. 1 or 2 (and, therefore, may be a router node 205 of FIG. 2 or 3).

Figure 5A:
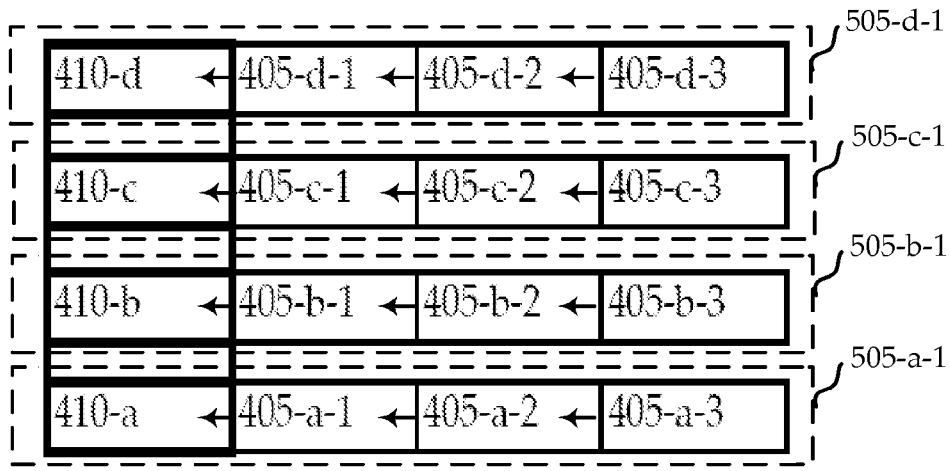
FIGS. 5A and 5B are block diagrams illustrating routing tables for a mesh network according to various embodiments of the invention.

In FIGS. 4A and 4B, a number of field nodes 405, 410 are shown located on different floors of a building 415. In FIG. 4A, certain field nodes are shown located on Floor 1 (field nodes 405-*a*, 410-*a*), Floor 2 (field nodes 405-*b*, 410-*b*), Floor 3 (field nodes 405-*c*, 410-*c*), and Floor 4 (field nodes 405-*d*, 410-*d*). In this embodiment, a floor includes one type of field node 410 that is known to be located on a given floor, while other field nodes 405 may be mobile and the floor location may be estimated based on routing tables and their relation to the known field node(s) 410. In FIG. 4B, one such field node 405-*c*-3 is moved from Floor 3 to Floor 2. Note, again, that the illustrated configurations are for purposes of example only Turning to FIG. 5A and FIG. 5B, a simplified example of various routing tables 500, 550 are shown. The routing tables 500, 550 may, for example, be compiled and stored by the base station node 120 or consolidating server 215 to indicate routing paths through various routing nodes. In FIG. 5A, an illustration of various routing tables shows the routing paths 505 through various field nodes 405, 410, and is representative of FIG. 4A. Each field node may forward an identification code that may be used to compile the routing tables associated with each of a number of known locations. For example, routing path 505-*d*-1 illustrates that on Floor 4, field node 405-*d*-3 is routed to field node 405-*d*-2, field node 405-*d*-2 is routed to field node 405-*d*-1, and field node 405-*d*-1 is routed to field node 410-*d*. Because location of 410-*d* is known to be Floor 4, the floor for the other routing nodes 405-*d* may be identified as Floor 4. A similar analysis applies to the other routing paths 505.

Figure 5B:
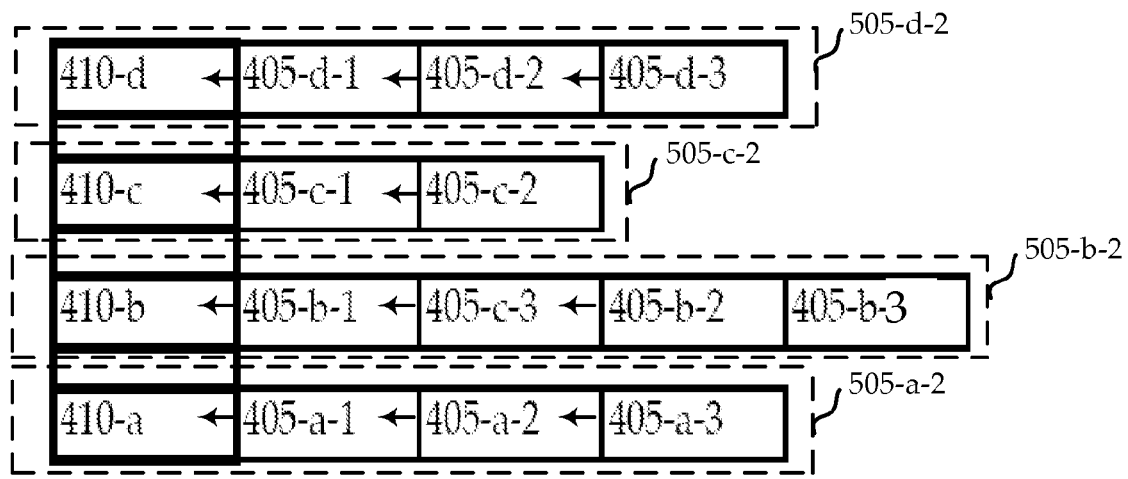

In FIG. 5B, an illustration of various routing tables again shows the routing paths 505 through various field nodes 405, 410, and is representative of FIG. 4B. As above, each field node may forward an identification code that may be used to compile the routing tables associated with each of a number of known locations. As noted, in FIG. 4B, field node 405-*c*-3 is moved from Floor 3 to Floor 2. As a result, routing path 505-*c*-2 illustrates that on Floor 3, field node 405-*c*-2 is routed to field node 405-*c*-1, and field node 405-*c*-1 is routed to field node 410-*c*. Because location of 410-*c* is known to be Floor 3, the floor for the other routing nodes 405-*c* may be identified as Floor 3. Because field node 405-*c*-3 is no longer routed through field node 410-*c*, it may be determined that field node 405-*c*-3 has been moved.

Similarly, routing path 505-*b*-2 illustrates that on Floor 2, field node 405-*b*-3 is routed to field node 405-*b*-2, field node 405-*b*-2 is routed to field node 405-*c*-3, field node 405-*c*-3 is routed to field node 405-*b*-1, and field node 405-*b*-1 is routed to field node 410-*b*. Because location of 410-*b* is known to be Floor 2, the floor for the other routing nodes 405-*b*, 405-*c*-3 may be identified as Floor 2.

Therefore, the example illustrates how a location change (and perhaps the new location) of a mobile field node 405 may be signaled by changes in a routing table. The location information may be generated by analyzing the changes to a routing path through known or estimated locations of field nodes 410. While in the foregoing example, floors were used to delineate areas, in other embodiments a known location may be a room, set of rooms, set of floors, building, set of buildings, etc. It is also worth noting that while the illustrated example includes a consolidated routing table, the routing table for a single node may provide similar information.

There are a number of actions that may occur after movement of a field node 405 is recognized by the base station node 120, consolidating server 215, or field node 405 itself. For example, certain floors or areas may be prohibited, and movement may cause the monitored device to be shut off or disabled (because of an internal or a remotely generated shut-off or disable command). A change in location may trigger re-authentication requirements. Other security may be triggered with movement (e.g., an alarm may be triggered causing maintenance or security personnel to re-establish the location of the device). Note that a change in the routing table of a first field node 405 may indicate changes in location of other field nodes (e.g., indicating that a new field node 405 has entered or left a given area (room(s), floor(s) or building(s))).

Figure 6A:
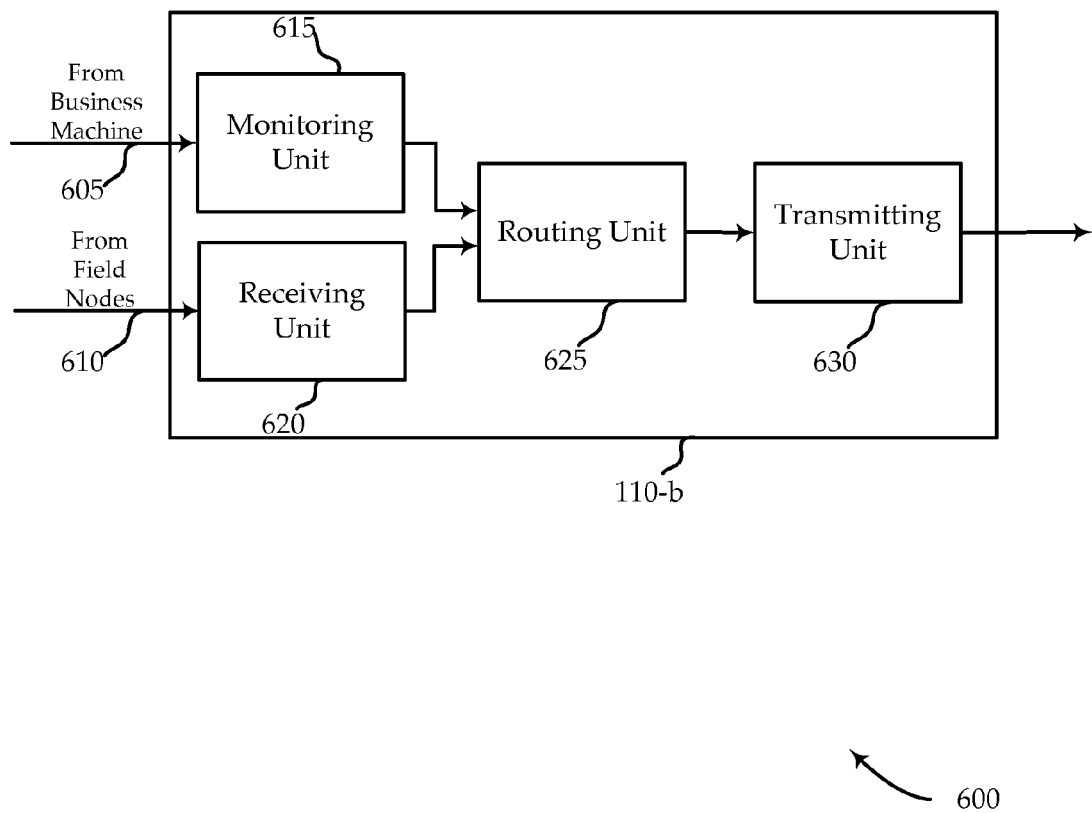
FIGS. 6A and 6B are block diagrams illustrating field node configurations according to various embodiments of the invention.

Turning next to FIG. 6A, an example configuration 600 of a field node 110-b is shown according to various embodiments of the invention. This may be a field node 110 of FIG. 1 or 2. In the illustrated embodiment, the field node 110-b includes a monitoring unit 615, a receiving unit 620, a routing unit 625, and a transmitting unit 630. These units may be implemented, in whole or in part, in hardware. Thus, they may each be made up of one, or more, Application Specific Integrated Circuits (ASICS) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. Each may also be implemented, in whole or in part, with instructions embodied in a memory, formatted to be executed by one or more general or application specific processors. The tables described above may be stored in local memory.

In the illustrated embodiment, the field node 110-b may be attached with a monitored device in a removable or more permanent fashion, or may be integrated with the monitored device (e.g., a business machine). The monitoring unit 615 receives 605 monitoring data (e.g., status, usage, or location data) from the monitored device (e.g., in response to specific queries, or perhaps through passive monitoring without specific response from the monitored device). The monitoring unit 615 may acquire the data from any data port, sensor, or signaling mode of the monitored device.

A receiving unit 620 may be configured to receive various types of data 610 from other field nodes. For example, it may receive monitoring data from other field nodes for forwarding. It may also receive commands initiated by, for example, a consolidating server 215 or base station node 120, which may be formatted to control the functions of the receiving field node (e.g., controlling monitoring, security, routing, disablement functions for the business machine or other monitored device).

A routing unit 625 may maintain a routing table for the transmission of monitoring data within the mesh network. Specific routing paths may be selected by the field node itself, or be received by the field node by another field node, a consolidating server 215 or a base station node 120. The routing unit 625 may identify a destination field node within the mesh network 115 for transmission of the of monitoring data (either monitored by the field node or received from other field nodes).

A transmitting unit 630 may be configured to modulate, amplify, and upconvert the monitoring data to the destination field node (perhaps for eventual forwarding to a consolidating server 215 or base station node 120. In other embodiments, it is worth noting that a field node 110-b need not include a receiving unit 620, and may simply transmit its own monitored data.

Figure 6B:
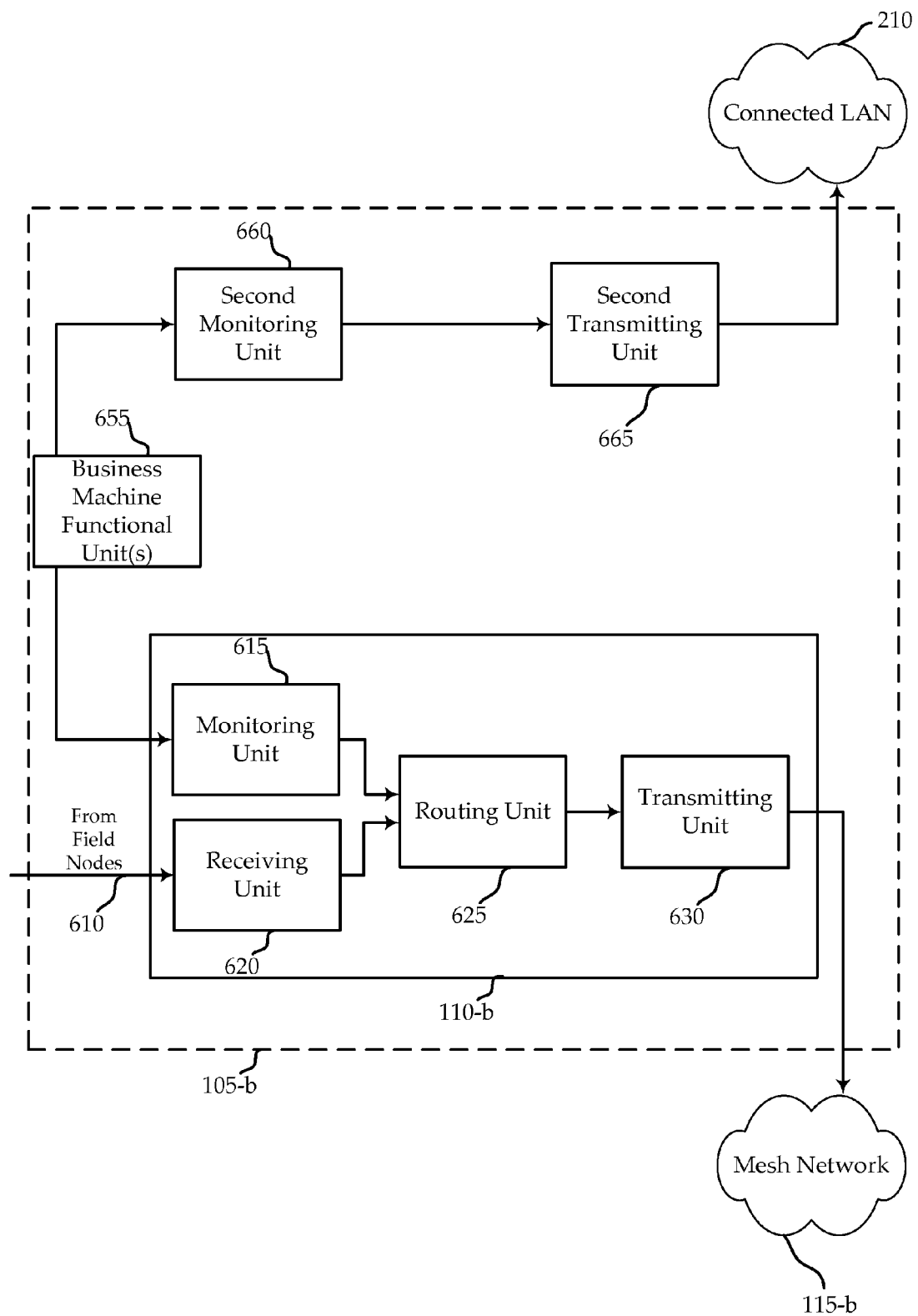

Turning next to FIG. 6B, an example configuration of a system 650 including a monitored device 105-b and field node 110-b coupled thereto is shown according to various embodiments of the invention. In the illustrated embodiment, the field node 110-b described with reference to FIG. 6A is integrated into monitored device 105-a. As described above with reference to FIG. 6A, the monitoring unit 615 may receive 605 monitoring data from the business machine functional unit(s) 655 (e.g., copier, scanner, fax, or printer functional units). The transmitting unit 630 of the field node 110 transmits monitored data over a mesh network 115-b.

In the illustrated embodiment, the monitored device 105-b also includes a second monitoring unit 660 and second transmitting unit 665. These functional units may be in addition to similar units of the field node 110-b. Thus, the second monitoring unit 660 may collect the usage data from the monitored device 105-b differently than the monitoring unit 615 of the field node 110-b (e.g., reading from memory instead of monitoring an output signal). While the same data may be collected in different ways, it is also worth noting that different types of data may be monitored by each unit (e.g., the monitoring device 615 connected with the mesh network 115 may collect and forward location information and may serve as a backup monitoring device, while the second monitoring device 660 may collect usage data). The second transmitting unit 665 may transmit the monitored data via the connected local area network 210, the connected local area network 210 distinct from the mesh network 115-b. While the illustrated embodiment shows a monitored device 105-b with two distinct communication interfaces and separate monitoring units 615, 665, in other embodiments the may be a single interface, network, and/or monitoring unit.

Figure 7:
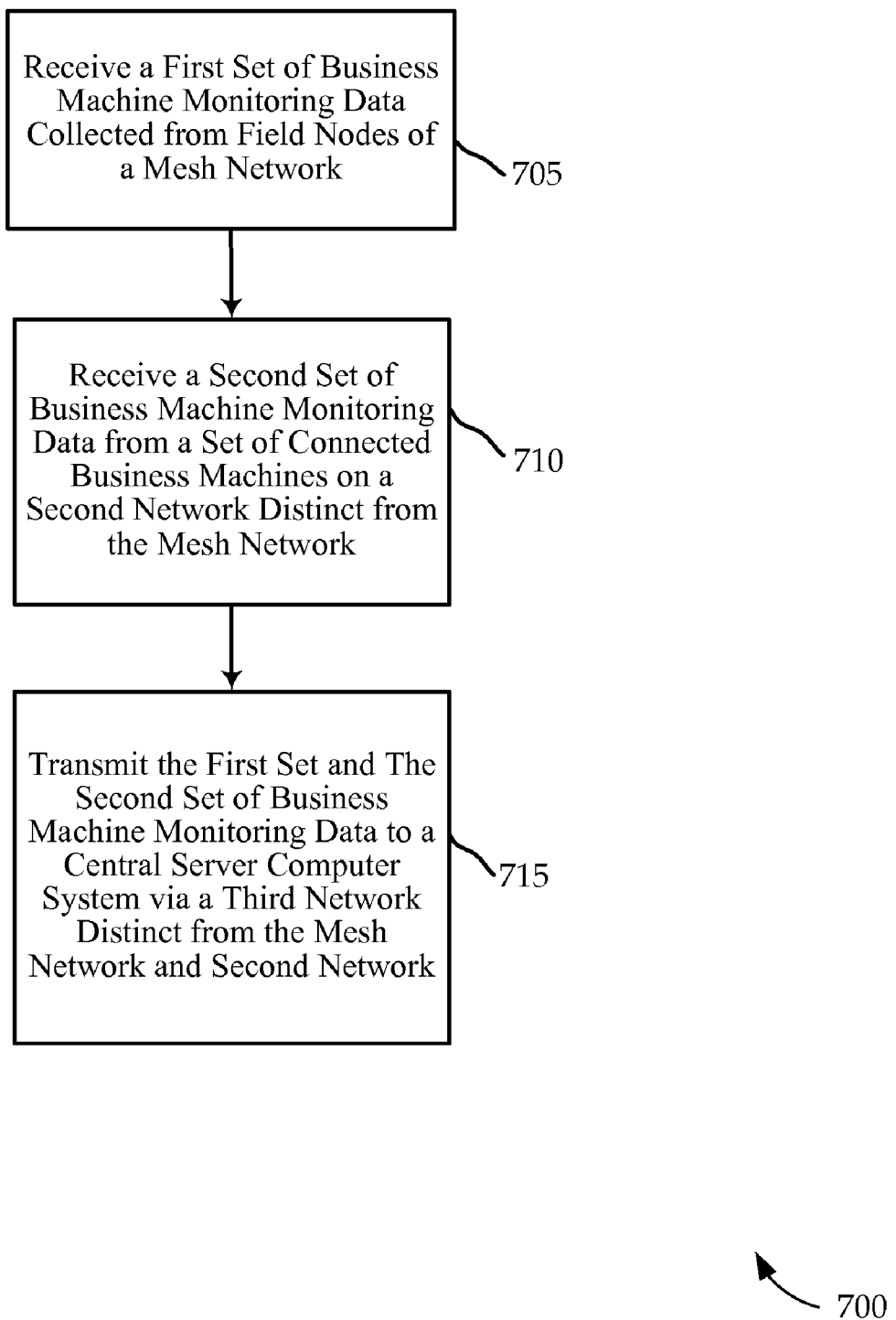
FIG. 7 is a method of collecting business machine monitoring data according to various embodiments of the invention.

Turning to FIG. 7, a flowchart is shown illustrating a method 700 of collecting business machine monitoring data according to various embodiments of the invention. The method 700 may, for example, be performed in whole or in part by any combination of the base station node 120, consolidating node 215, or the central server computer system 230 of FIG. 1 or 2.

At block 705, a first set of business machine monitoring data collected from field nodes of a mesh network is received via a mesh network. The first set of data may be aggregated before reception by an intermediate device (e.g., a base station node) before it is received. At block 710, a second set of business machine monitoring data from a second set of connected business machines on a second network distinct from the mesh network is received. At block 715, the first set and the second set of business machine monitoring data are transmitted to a central server computer system via a third network distinct from the mesh network and second network.

Figure 8:
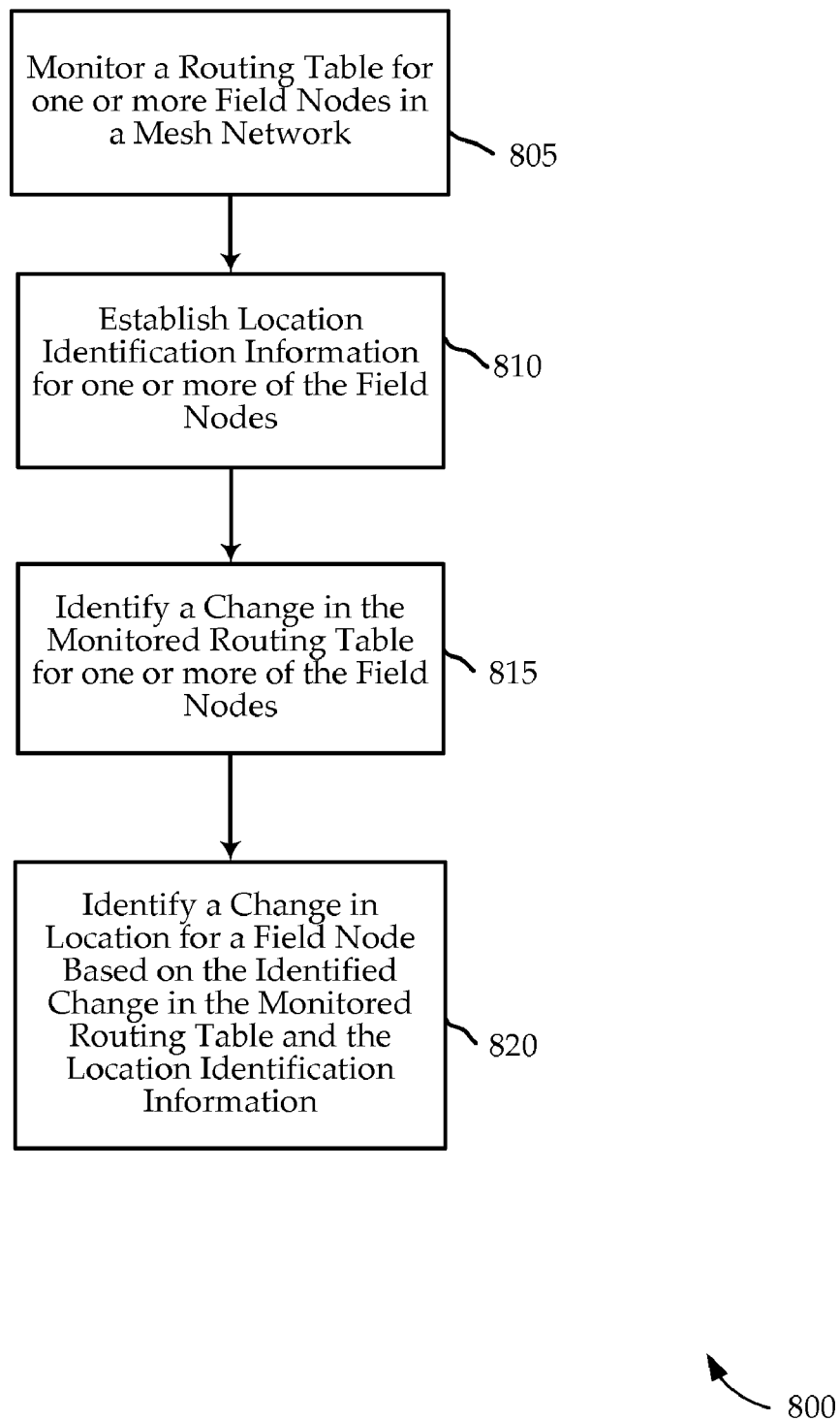
FIG. 8 is a method of identifying a change in field node location according to various embodiments of the invention.

Turning next to FIG. 8, a flowchart is shown illustrating a method 800 of identifying a change in field node location according to various embodiments of the invention. The method 800 may, for example, be performed in whole or in part by any combination of the base station node 120, consolidating node 215, or the central server computer system 230 of FIG. 1 or 2.

At block 805, a routing table for one or more field nodes in a mesh network is monitored. The routing table may be associated with a single field node, or may be a routing table for a group of field nodes. At block 810, location identification information for one or more of the field nodes is established. Thus, certain field nodes may be associated with certain areas (e.g., rooms, floors, or buildings). The location of such field nodes may be known or estimated, and the field nodes may be mobile or affixed.

At block 815, a change in the monitored routing table is identified for one or more of the field nodes. At block 820, the change in location for a field node is identified based on the identified change in the monitored routing table and the location identification information. The identified change in location may be the identification of a new location (e.g., based on an association in a routing table between a field node with a known location), or may simply be an identification of change. The identified change may result in a re-authentication requirement, additional security commands, or a disable command.

Figure 9:
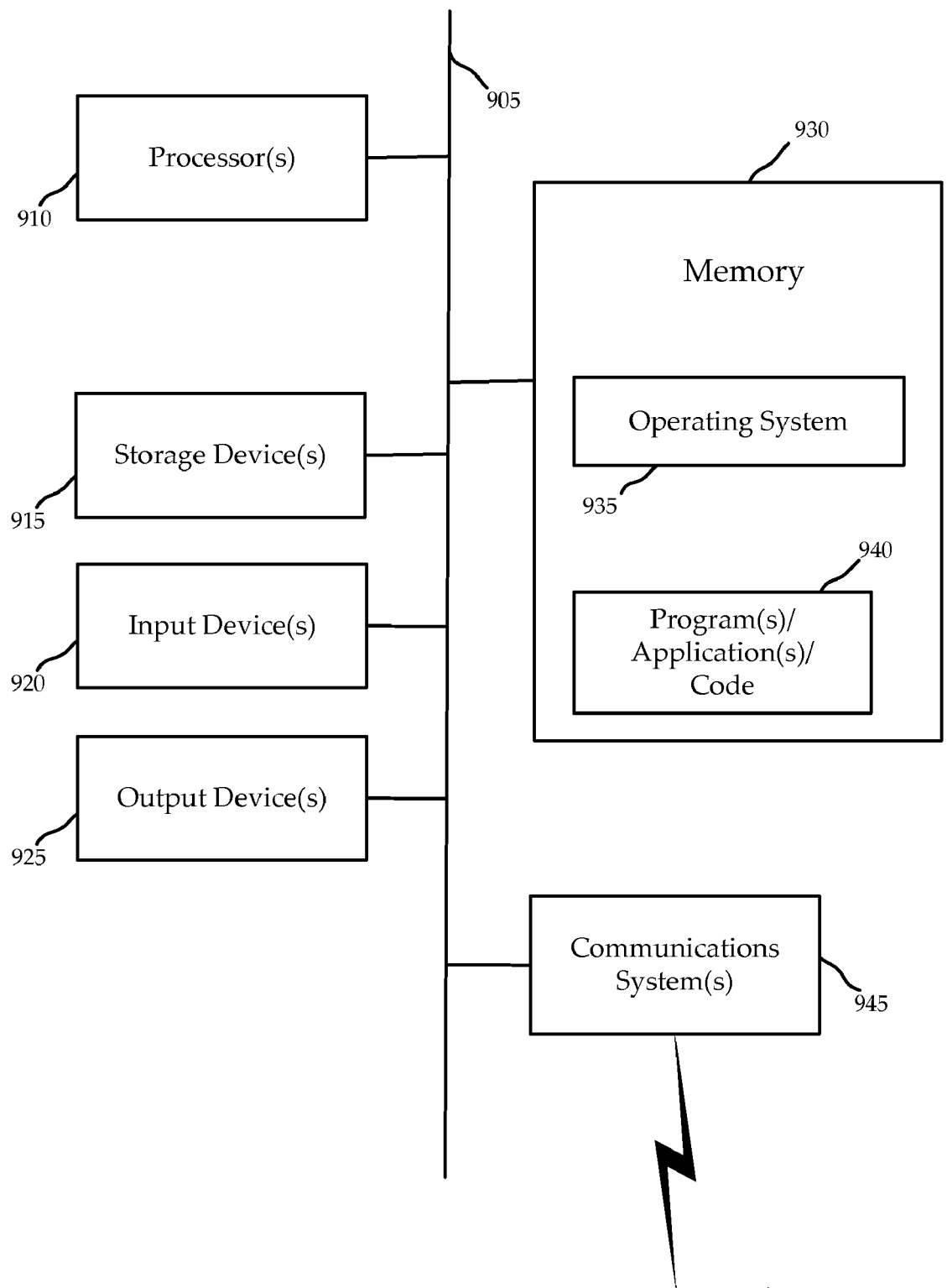
FIG. 9 is a schematic diagram that illustrates a representative device structure that may be used in various embodiments of the present invention.

A device structure 900 that may be used for a monitored device 105, field node 110, base station node 120, consolidating server 215, routing node 205, server computer system 230, or other computing device described herein is illustrated with the schematic diagram of FIG. 9. This drawing broadly illustrates how individual system elements of each of the aforementioned devices may be implemented, whether in a separated or more integrated manner. The example structure is shown comprised of hardware elements that are electrically coupled via bus 905, including processor(s) 910 (which may further comprise a DSP or special-purpose processor), storage device(s) 915, input device(s) 920, and output device(s) 925. The storage device(s) 915 may be a computer-readable storage media reader connected to any computer-readable storage medium, the combination comprehensively representing remote, local, fixed, or removable storage devices or storage media for temporarily or more permanently containing computer-readable information. The communications system(s) 945 may be one or more wired, wireless, or other type of interfacing connection that permits data to be exchanged with or received from other devices (e.g., two-way communication and receiving location data). The communications system(s) 945 may permit data to be exchanged with any number of networks.

The structure 900 may also include additional software elements, shown as being currently located within working memory 930, including an operating system 935 and other code 940, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flowchart or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system for monitoring business machines using a mesh network, the system comprising:
   a plurality of field nodes comprising the mesh network, wherein at least a subset of the plurality of field nodes is each configured to:
      monitor usage of a selected one of a first plurality of business machines to generate a first set of monitoring data including location information; and
      transmit the first set of monitoring data through other field nodes of the mesh network;
   a base station node, in communication with the subset of the plurality of field nodes via the other field nodes; and configured to:
      receive the first set of monitoring data transmitted from the at least a subset of the plurality of field nodes via the other field nodes;
      monitor a routing table for the at least a subset of the field nodes;
      identify a change in the monitored routing table for one or more of the at least a subset of the field nodes;
      identify a change in location based at least in part on the identified change in the monitored routing table and the location information of the first set of monitoring data; and
      aggregate the received first set of monitoring data and the data comprising the identified change in location to generate an aggregated set of monitoring data; and
   a consolidating server, in communication with the base station node, and configured to:
      receive the aggregated set of monitoring data;
      collect a second set of monitoring data from a second plurality of business machines via a second network distinct from the mesh network; and
      transmit at least a subset of the first set of monitoring data, the data comprising the identified change in location, and the second set of monitoring data.

2. The system of claim 1, wherein a selected field node of the plurality of field nodes comprises a business machine of the first or the second plurality of business machines.

3. The system of claim 1, wherein each of at least a subset of the first or the second plurality of business machines is configured to be removably coupled with a selected field node of the plurality of field nodes.

4. The system of claim 1, further comprising:
a selected business machine comprising both one of the first plurality of business machines and one of the second plurality of business machines,
wherein a field node of the plurality of field nodes is configured to transmit the first set of usage data collected from the selected business machine when the second network is not operating.

5. The system of claim 1, further comprising:
a selected business machine comprising one of the first plurality of business machines and not one of the second plurality of business machines,
wherein a first field node of the plurality of field nodes is coupled with the selected business machine, and the first field node is configured to shut down the selected business machine based at least in part on a message received from the consolidating server.

6. The system of claim 1, wherein,
a business machine of the first or the second plurality of business machines comprises a copier, fax, or scanner; and
the monitoring data comprises usage data, status data, or location data.

7. The system of claim 1, wherein the consolidating server is further configured to:
transmit the aggregated set of monitoring data and the second set of monitoring data via a third network.

8. The system of claim 7, further comprising:
a remote central server computer system, in communication with the consolidating server, and configured to received the aggregated set of monitoring data and the second set of monitoring data.

9. The system of claim 1, wherein a selected field node of the plurality of field nodes is configured to shut down because of a failure to receive a communication from the consolidating server based at least in part on a change in location of the selected field node causing a change in a routing table entry.

10. A method of collecting business machine monitoring data, the method comprising:
at a server,
receiving a first set of business machine monitoring data including location information collected from field nodes of a first network comprising a mesh network;
monitoring a routing table for at least a subset of the field nodes in the mesh network;
identifying a change in the monitored routing table for one or more of the at least a subset of the field nodes; and
identifying a change in location based at least in part on the identified change in the monitored routing table and the location information;
receiving a second set of business machine monitoring data from a second set of connected business machines via a second network distinct from the mesh network; and
transmitting at least a subset of the first set of business machine monitoring data, data comprising the identified change in location, and the second set of business machine monitoring data.

11. The method of claim 10, further comprising:
at the server,
aggregating the first set of business machine monitoring data collected from field nodes of the mesh network.

12. The method of claim 10, wherein the first set and the second set of business machine monitoring data is transmitted via a third network distinct from the first network and the second network.

13. The method of claim 10, wherein,
the first set of business machine monitoring data is received from a first base station node collecting data from the field nodes of the first network; and
the second set of business machine monitoring data is received from a second base station node collecting data from the field nodes of the second network.

14. The method of claim 10, wherein a selected field node of the field nodes of the first network comprises a business machine.

15. The method of claim 10, wherein at least a subset of the field nodes of the first or second network is configured to be removably coupled with a business machine.

16. The method of claim 10, wherein,
a selected business machine comprises both one of the first set of business machines and one of the second set of business machines; and
wherein a field node of the first network is configured to transmit the first set of monitoring data collected from the selected business machine when the second network is not operating.

17. The method of claim 10, wherein,
a selected business machine comprises one of the first set of business machines and not one of the second set of business machines,
wherein a first field node of the field nodes of the first network is coupled with the selected business machine, and the first field node is configured to shut down the selected business machine based at least in part on a message received from the server.

18. The method of claim 10, wherein,
a business machine of the first or the second set of business machines comprises a copier, fax, or scanner; and
the monitoring data comprises usage data, status data, or location data.

19. The method of claim 10, further comprising:
aggregating the first set of business machine monitoring data collected from field nodes of the mesh network,
wherein the transmitting comprises transmitting the aggregated set of monitoring data and the second set of monitoring data via a third network.

20. A system for collecting business machine monitoring data, the system comprising:
means for receiving a first set of business machine monitoring data including location information collected from field nodes of a first network comprising a mesh network;
means for monitoring a routing table for at least a subset of the field nodes in the mesh network;
means for identifying a change in the monitored routing table for one or more of the at least a subset of the field nodes; and
means for identifying a change in location based at least in part on the identified change in the monitored routing table and the location information;
means for receiving a second set of business machine monitoring data from a second set of connected business machines via a second network distinct from the mesh network;
means for consolidating the first set of business machine monitoring data, data comprising the identified change in location, and the second set of business machine monitoring data; and means for transmitting at least a subset of the consolidated data.

21. The system of claim 20, further comprising:
means for aggregating the first set of business machine monitoring data collected from field nodes of the mesh network, wherein the means for transmitting transmits the aggregated set of monitoring data and the second set of monitoring data via a third network.

* * * * *